United States Patent [19]

Schaper

[11] 4,445,722
[45] May 1, 1984

[54] SEAT BELT LATCH FOR REAR SEATS

[75] Inventor: Dieter Schaper, Nauheim, Fed. Rep. of Germany

[73] Assignee: General Motors Corporation, Detroit, Mich.

[21] Appl. No.: 346,487

[22] Filed: Feb. 8, 1982

[30] Foreign Application Priority Data

Mar. 19, 1981 [DE] Fed. Rep. of Germany ....... 3110689

[51] Int. Cl.³ ...................... B60R 21/00; A47D 15/00
[52] U.S. Cl. ................................ 297/468; 296/65 A; 296/65 R; 297/216; 297/379; 297/479
[58] Field of Search .......................... 296/65 R, 65 A; 280/803, 801; 297/468, 379, 479, 216

[56] References Cited

U.S. PATENT DOCUMENTS 4,133,556  1/1979  Glinski .............................. 280/801
4,194,786  3/1980  Gilmore ............................. 297/486
4,316,633  2/1982  Zaccariotto .................... 297/468 X

FOREIGN PATENT DOCUMENTS 2844858  4/1980  Fed. Rep. of Germany ...... 297/468
2924144  1/1981  Fed. Rep. of Germany ...... 297/479
2928341  1/1981  Fed. Rep. of Germany .
2931552  2/1981  Fed. Rep. of Germany .

Primary Examiner—James T. McCall
Attorney, Agent, or Firm—Charles E. Leahy

[57] ABSTRACT

The present invention relates to a seat belt arrangement for the rear seats of motor vehicles in which the seat cushions of the rear seats can be folded away without interference by the seat belts, and no portions of the seat belt system form an obstruction on the vehicle floor. The belt buckle is secured to a lever which is mounted for pivoting movement on the frame of the seat bottom so that the buckle is concealed within an opening in the seat bottom or projects up out of the opening to buckle a seat belt. This lever is provided with a hook which is adapted for engagement into a latch on the floor when the lever is pivoting such that the belt buckle will project through the opening and out of the seat bottom. The pivoting movement of the lever is achieved by way of the actuating mechanism which is located inboard of the seat bottom and abutting thereon, and which will cause pivoting movement of the lever when the seat cushion of the seat bottom is being depressed.

7 Claims, 8 Drawing Figures

SEAT BELT LATCH FOR REAR SEATS

The invention relates to a seat belt system for the rear seat of a motor vehicle in which the seat bottom is connected for upward pivoting movement about a forward edge, with one opening being provided in the seat bottom per seat belt for a belt buckle that is connected to the vehicle floor, said belt buckle being used for coupling to an associated latch plate, which is attached to a lap and/or shoulder belt.

BACKGROUND OF THE INVENTION

In the prior art seat belt system of German Offenlegungsschrift 29 31 552, by Roger Woolnough, a belt buckle is retained in a sleeve which is mounted for pivotal movement to the vehicle floor and is urged by a spring into an upwardly pointing oblique position. When the seat bottom is being folded forwardly and the seat back is folded down to take its place on the vehicle floor, the seat back will urge the sleeves containing the belt buckles into a horizontal position. As soon as the seat back is raised up again, the sleeves with their belt buckles will automatically return to their upright position so that when the seat bottom is returned to its original position, the sleeves will be restored within the openings to their ready-to-use position.

The advantage of this particular prior art seat belt arrangement, as compared to the typical earlier arrangements in which the belt buckles were extending between the seat bottom and seat back were resting loosely on the seats, is the fact that one need not pay attention to the seat belts when the back seats are folded down and folded back, because they will not interfere with the folding operation and will return to their original position after the seats are folded back up again.

However, the seat belt arrangement according to DE-OS 29 31 552 is not suitable for those types of rear seats in which the seat back is stored by first folding the seat back forwardly and placing it on the seat bottom, and then folding the seat bottom and the seat back forwardly as one unit.

In order to ensure that the rear seats can be folded away in a vehicle having the type of folding mechanism mentioned above without interference by the seat belts and with no belt buckles remaining on the vehicle floor after the seats have been stored away, it has been proposed in accordance with Offenlegungsschrift, by Joachim Beitz, 29 28 341 that the belt buckles be fastened to the bottom of the seat backs. For this purpose, the back seat is provided with a downwardly directed hook which, when the seat back is in its normal upright position, will engage with an anchor plate attached to the vehicle floor. In this arrangement, the buckle is anchored to the seat back and the seat back to the vehicle floor. As the seat back is pivoted forwardly, it will first disengage from the anchor plate and can subsequently be folded down forwardly together with the belt buckles.

SUMMARY OF THE INVENTION

The present invention relates to a seat belt arrangement for the rear seats of motor vehicles in which the seat cushions of the rear seats can be folded away without interference by the seat belts and no portions of the seat belt system form an obstruction on the vehicle floor. The belt buckle is secured to a lever which is mounted for pivoting movement on the frame of the seat bottom so that the buckle is concealed with an opening in the seat bottom or projects up out of the opening to buckle a seat belt. This lever is provided with a hook which is adapted for engagement into a latch on the floor when the lever is pivoting such that the belt buckle will project through the opening and out of the seat bottom. The pivoting movement of the lever is achieved by way of the actuating mechanism which is located inboard of the seat bottom and abutting thereon, and which will cause pivoting movement of the lever when the seat cushion of the seat bottom is being depressed.

It is the object of the present invention to provide a seat belt arrangement of the type described in the foregoing in which the belt buckles are anchored directly to the vehicle floor, but wherein regardless of the type of folding system used for the rear seats, the belt buckles do not become an obstacle on the vehicle floor.

The advantages of the novel seat belt arrangement are manifold. As long as the rear seat equipped with the seat belt arrangement according to the invention is not occupied, the belt buckles are not coupled to the vehicle floor. Therefore, the rear seat may be folded away without any difficulty and with no additional manipulations as compared to a vehicle having no seat belts. When a person occupies the seat, the respective lever with the belt buckle will pivot upwardly, and its coupling element will engage the anchoring element provided in the vehicle floor. This will establish a solid connection between the belt buckle and the vehicle floor.

There is also the advantage that the belt buckles are made to pivot upwardly only after a seat is being occupied, so that they do not interfere with an unoccupied seat. Furthermore, as the belt buckles are being pivoted upwardly, the vehicle occupants are being reminded to apply the seat belt, and the system therefore has what can be called a persuasive character.

DESCRIPTION OF THE PREFERRED EMBODIMENT

Figure 1:
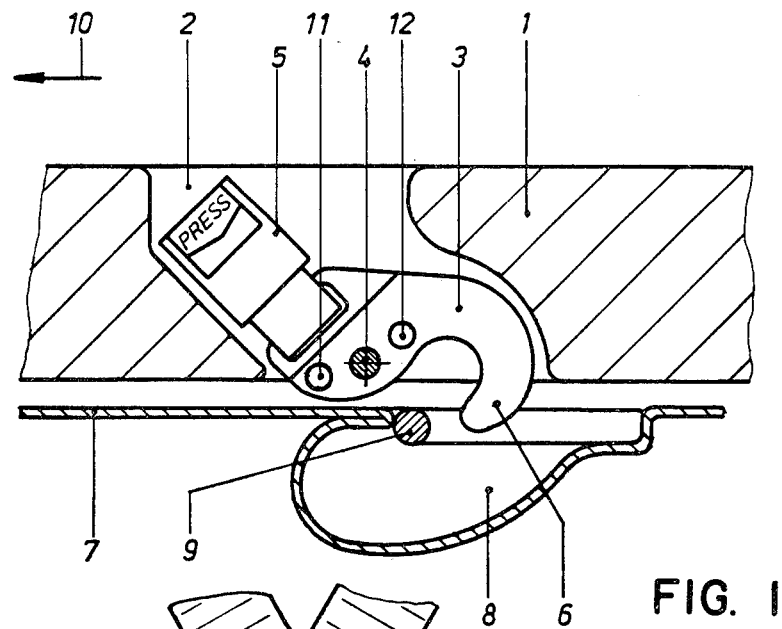
FIG. 1 is a cross section of a portion of a seat bottom with a portion of the seat belt arrangement according to the invention and with the seat being unoccupied.

In FIG. 1 a rearwardly located seat cushion 1 of the seat bottom is illustrated in cross section and is mounted upon seat frame members. In this seat cushion 1 there is provided for each occupant seating space an opening 2 which accommodates a two-armed lever 3 adapted for pivoting movement about a pivot pin 4 attached to a seat frame member as will be discussed hereinafter with reference to FIGS. 3 and 4. The lever carries at its upwardly pointing lever arm a belt buckle 5 of the ordinary type. The other arm of lever 3 serves as a coupling member and is, in this instance, in the form of a hook 6.

Beneath the seat cushion 1 there is a floor pan 7, as illustrated in FIG. 1, and underneath the hook 6 the floor pan is provided with a cavity 8 and a latch 9. The arrow 10 in FIG. 1 is pointing in the forward direction of the vehicle. Two apertures 11, 12 located ahead and behind pivot pin 4, respectively, are provided in lever 3 for supporting an actuator mechanism (to be described later) by which the lever 3 is moved in a clockwise direction (as seen in the drawing) when a person occupies the seat cushion 1.

Figure 2:
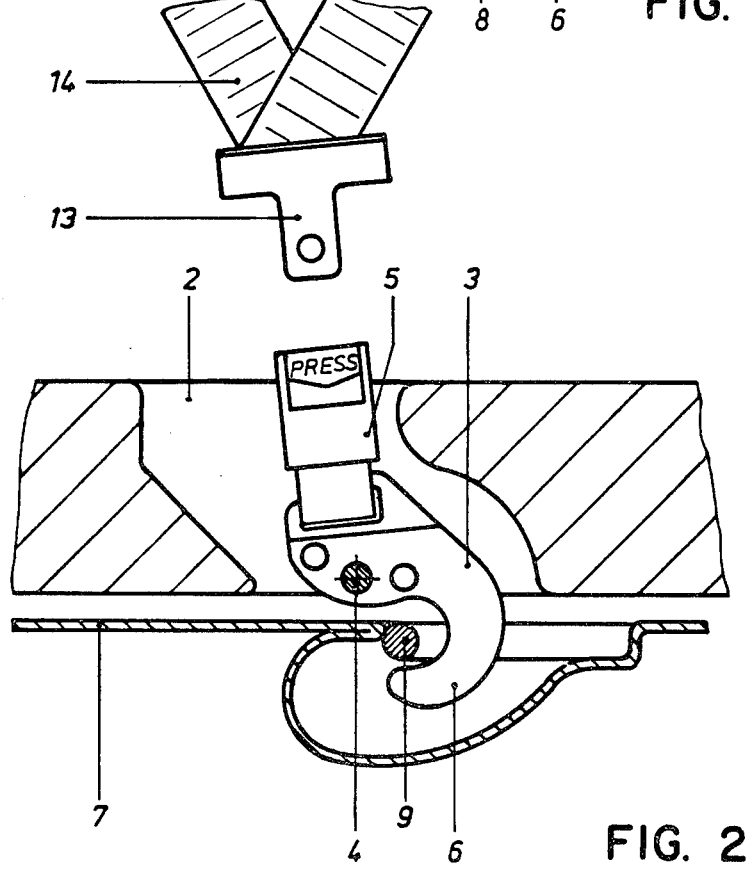
FIG. 2 is the arrangement according to FIG. 1 in a position in which the seat is occupied.

The operation of the seat belt arrangement according to the invention shall now be described with FIG. 2 being included into the discussion. In FIG. 1, the belt buckle 5 does not project out of the opening 2. Likewise, hook 6 does not engage with latch 9. Consequently, the seat cushion 1 may be folded down or pivoted upwardly without difficulty as the lever 3 and belt buckle 5 are pivoting together with the seat cushion 1. When the seat cushion 1 is being occupied by a person and is thereby pushed downwardly, the lever 3 will move (for reasons explained later) in clockwise direction about pivot pin 4. The hook 6 will then engage the latch 9 from below and will thus lock the lever 3 to the floor pan 7. At the same time, the belt buckle 5 will emerge from the opening 2, and it will then be rather easy to slide a plate 13 of a seat belt 14 into the belt buckle 5. When the seat belt 14 is being released, and when the occupant leaves his seat, the lever 3 will automatically return into the position shown in FIG. 1.

It is apparent from the above that instead of this particular arrangement, it is also possible that the lever 3 be provided with an eye, rather than a hook, which would then engage with a hook attached to the floor pan. Such an arrangement would be similar to the seat belt anchoring means used in current vehicles.

Figure 3:
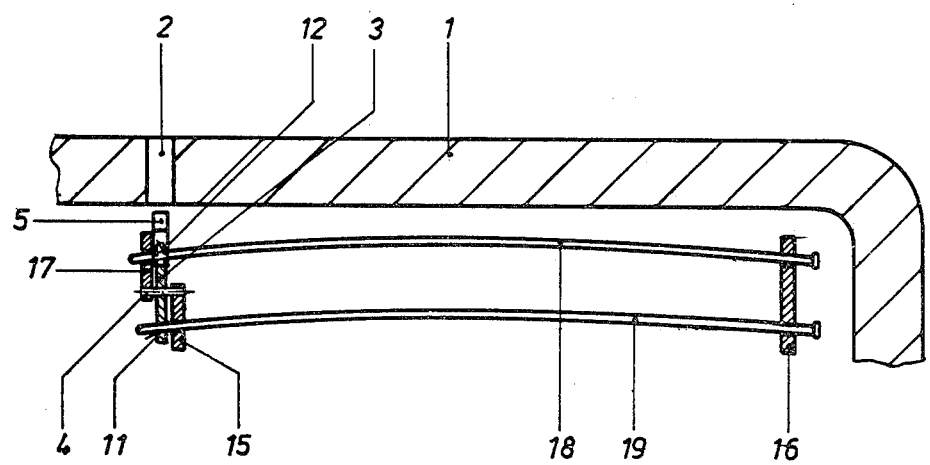
FIG. 3 is a schematic illustration of a first embodiment of an actuating mechanism for effecting the pivoting movement of a lever with the belt buckle, as illustrated in FIGS. 1 and 2.
Figure 4:
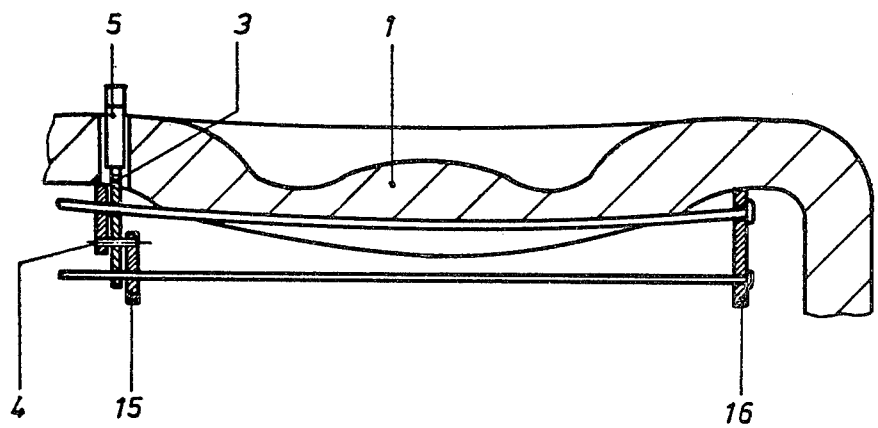
FIG. 4 is the arrangement according to FIG. 3 in a position in which the rear seat is occupied.

Referring now to FIGS. 3 and 4, it will become apparent as to how the actuating mechanism for the pivoting movement of lever 3 may be fashioned. FIG. 3 illustrates again the seat cushion. Mounted inboard of said seat cushion and transversely of the vehicle are spaced-apart frame members 15, 16 and immediately adjacent to the frame member 15 there is a frame member 17. The lever 3 with belt buckle 5 is attached by means of pivot pin 4 to the frame member in such a fashion that the lever 3 will be located between the frame members 15 and 17. Two upwardly curved elastic rods 18, 19 are located transversely in the vehicle between the frame members 15 and 16, and the elastic rods are fixed with their ends opposite of lever 3 to frame member 16. The upper rod 18 extends through aperture 12 (see also FIG. 1) of lever 3 and is attached to frame member 17. Rod 19 extends through frame member 15 and then projects into aperture 11 of lever 3 (see also FIG. 1).

The operation of the actuating mechanism illustrated in FIGS. 3 and 4 is as follows: When the seat cushion 1 is being occupied, the rods 18,19 are being bent downwardly along their midsections, since they are in contact with the seat cushion 1 or portions thereof, such as the springs. As the rod 18 is bending downwardly, it will also pull lever 3 at the aperture 12 downwardly, whereas rod 19, as it is bent downwardly, will move with its free end upwardly and will cause the lever 3 to pivot upwardly by way of aperture 11. Thus, as the rods 18 and 19 are being bent downwardly, the lever 3 will be pivoted in clockwise direction and will assume the position illustrated in FIGS. 3 and 4.

Figure 5:
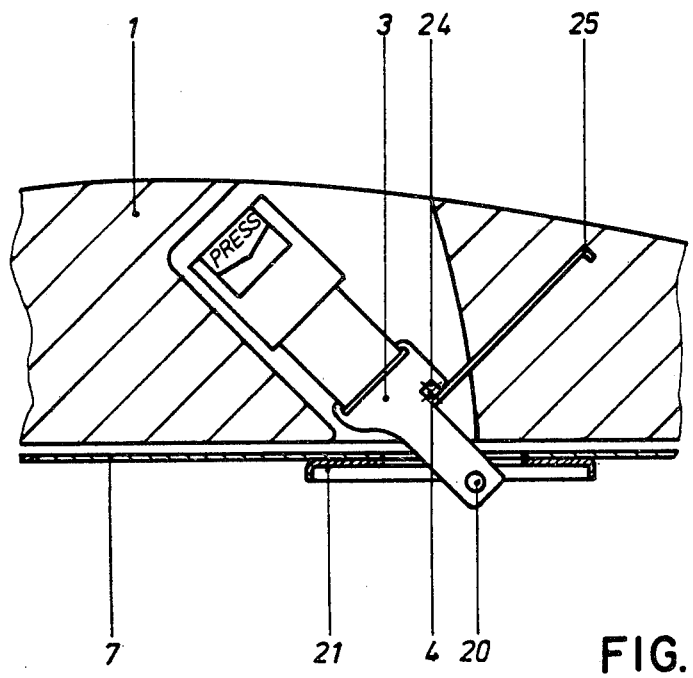
FIG. 5 is a second embodiment of the actuating mechanism for effecting the pivoting movement of the lever with the belt buckle as well as the coupling device of said lever and the floor pan of the vehicle, shown in cross section.
Figure 6:
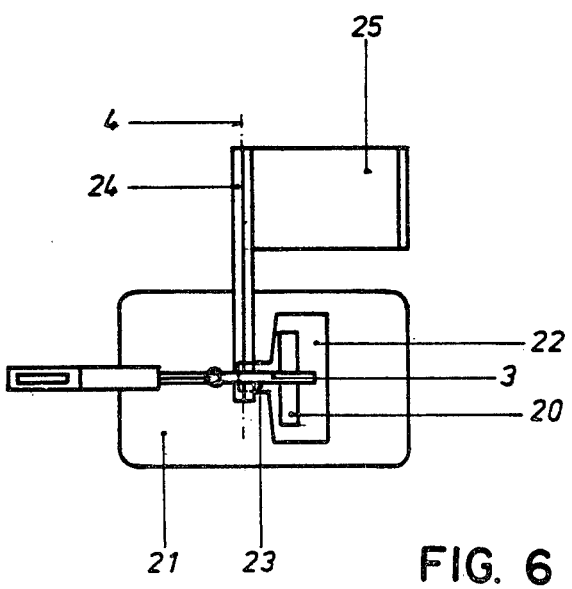
FIG. 6 is a plan view of the functionally essential components of the arrangement according to FIG. 5.

FIGS. 5 and 6 illustrate that the lever 3 with hook 3 and latch 9, as well as the actuating mechanism may be of a different configuration. Instead of having a hook 6, lever 3 is provided at its lower end with a transversely directed pin 20. An anchoring element 21 is attached to the underside of floor pan 7. Both the floor pan 7 and the anchoring element 21 are provided with an aperture 22 and a slot 23. When the lever 3 is moved about its pivot pin 4, pin 20 will enter into the aperture 22. Subsequently, lever 3 will move into slot 23 so that pin 20 will engage underneath the anchoring element 21, so that a locking connection between lever 3 and floor pan 7 will be established. Pivoting movement of lever 3 is achieved by a square shaft 24 which is attached to said lever 3. The square shaft 24 is provided with an arm 25 which extends upwardly at an angle into the seat cushion 1.

When a person occupies the seat and the seat cushion 1 is moved downwardly, lever 25 will also move downwardly. This will cause the square shaft to rotate, and lever 3 will pivot in clockwise direction. The subsequent operation is the same as described previously in conjunction with FIGS. 1 and 2.

Figure 7:
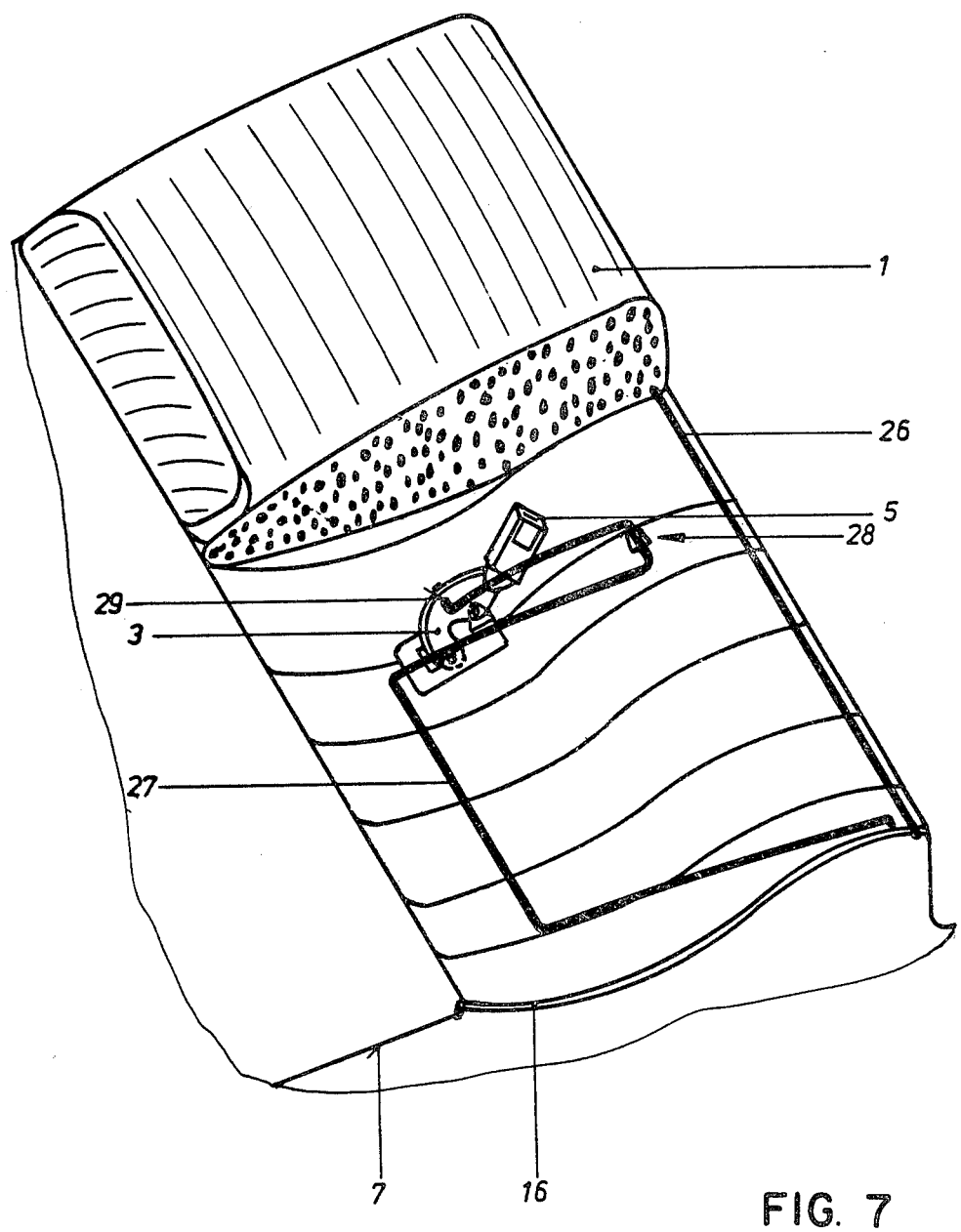
FIG. 7 is a three-dimensional view of a rear seat and a further embodiment of the seat belt arrangement according to the invention.
Figure 8:
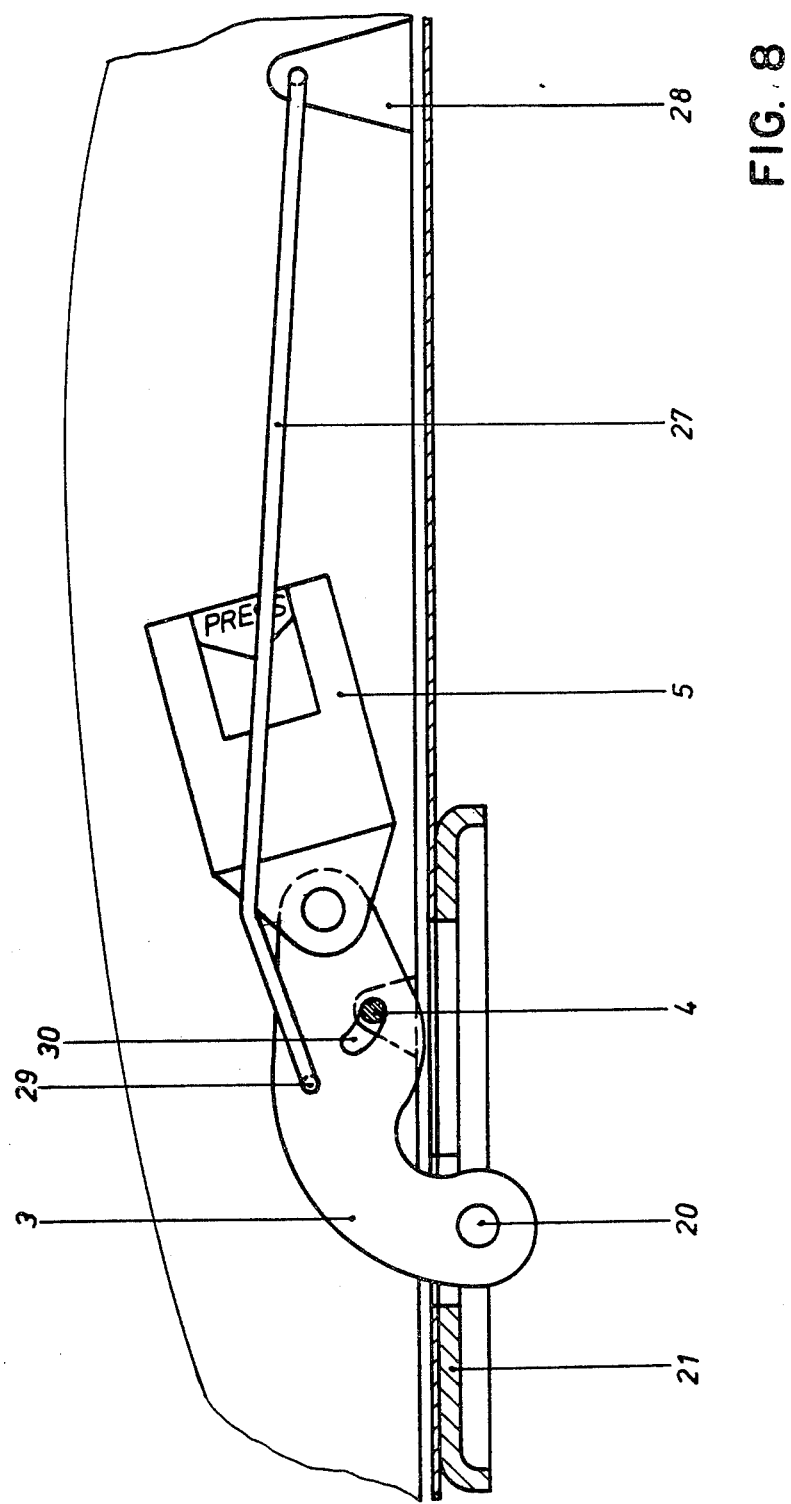
FIG. 8 is a side view of the functionally essential components of the arrangement according to FIG. 7.

FIGS. 7 and 8 illustrate another embodiment of the actuating mechanism for effecting the pivoting movement of lever 3 with belt buckle 5. FIG. 7 shows again the floor pan 7 and a seat cushion 1 being attached thereto. This seat cushion 1 is adapted for pivoting movement about a shaft 26 provided near its lower forward edge. A spring wire 27 has one of its ends clamped to the seat bottom frame 16 at a point in front and to the right of the seat, as viewed in the drawing. The U-shaped spring wire 27 first extends rearwardly, transversely, and then returns to the front of the seat. From there, the spring wire 27 extends through a bearing 28 that permits rotational movement, and then extends rearwardly again, and its other end is hooked into the lever 3 at a point 29. FIG. 8 illustrates very clearly that the lever 3 is mounted in a curved slot 30 for pivoting movement about a pivot pin 4. FIG. 8 furthermore illustrates how the spring wire 27 is hooked up at a point 29 located rearwardly of pivot pin 4 as viewed in the forward moving direction of the vehicle.

The spring tension of spring wire 27 is biased in such a fashion that its U-shaped section will abut against the seat cushion 1. When a person occupies the rear seat and the seat cushion 1 is moved downwardly, the U-shaped section of spring wire 27 will also pivot downwardly. This will also move the section of the spring wire 27 leading to the lever 3 downwardly. As a result, the lever 3 will be caused to pivot about its pivot pin 4 in a counter-clockwise direction. The lever 3 will thus be guided in the curved slot 30 such that the position of the imaginary axis of rotation changes continually, and the pin 20 will describe a curved path so as to extend its movement just below the line of the floor pan thus allowing more freedom in design, especially with respect to selecting a place for the fuel tank. As pointed out earlier, due to the pivoting movement of lever 3, the pin 20 will interlock with the anchoring member 21, and the belt buckle 5 will then extend through opening 2 to assume a position that will the render seatbelt fastening very convenient.

Upon depression of the seat cushion 1 the end of the actuating mechanism that engages with the lever 3, moves over a relatively large distance, so that the pivoting movement of the lever 3 is achieved relatively easily. It should also be emphasized that the actuating mechanism will always automatically return by the force of spring wire 27 against the seat cushion 1, so that belt buckles 5 will be urged downwardly through the openings 2 in the seat cushion 1 and return to their original position not only on account of their weight but also as a result of the inherent resiliency of the actuating mechanism.

The embodiments of the invention in which an exclusive property or privilege is claimed are defined as follows:

1. A safety belt arrangement for the rear seat of motor vehicles whose seat cushion and seat cushion frame of the seat bottom can be folded upwards relative the vehicle floor about a front edge, wherein for every kind of safety belt, the seat cushion has an opening for a belt buckle connected to the vehicle floor and with which there may be coupled a lock plate attached with a belt; characterized in that the belt buckle is arranged on one arm of a two-armed lever pivotally arranged on the seat cushion frame, which lever is provided at its other arm with a coupling member, and that the vehicle floor has an anchoring component and that between the seat cushion and the lever there is an actuating mechanism through which, during depression of the seat cushion by the occupant weight sitting thereon swings the lever into an anchoring position in which the coupling member automatically connects up with the anchoring component and when the occupant weight is removed from the seat cushion automatically disconnects the coupling member from the anchoring component.

2. Safety belt system in accordance with claim 1 characterized in that the lever is articulated to the seat cushion frame by a rotation axis and that a resilient bar is arranged transversely within the seat cushion and one end of the lever is guided at such a place that, during deflection of the bar owing to inspringing of the seat cushion, it swings the lever upwards with the belt buckle about the rotation axis.

3. Safety belt arrangement in accordance with claim 1 characterized in that the lever has a downwardly connected hook as the coupling element and that the anchoring component is formed by a trough in the vehicle frame and by a bolt arranged therein.

4. Safety belt arrangement in accordance with claim 1 characterized in that the lever has a transversely arranged pin as a coupling element and the anchoring component is provided by an opening proportioned to correspond with the length of the pin and an adjoining slot corresponding with the thickness of lever.

5. Safety belt arrangement in accordance with claim 1 characterized in that the actuating mechanism is provided by a spring wire which has an end firmly clamped at one forward side of the seat cushion, then led backwards in a U-turn and forwards again towards the middle of the seat, where a section transverse to the vehicle passes rotatably through a bearing, and a rearwardly directed spring wire section articulated to the lever behind the rotation axis of lever.

6. Safety belt arrangement in accordance with claim 1 characterized in that the rotation axis of lever is guided in a curved slot of the lever in such a manner that, during pivoting, the lever moves away from the vehicle floor.

7. A restraint belt arrangement for the rear seat of motor vehicles having a seat cushion frame pivotally mounted on the floor for movement of the seat cushion between a seating position and a stored position, the combination comprising:

a lever having a buckle element mounted thereon adapted for latching engagement by a mating buckle element carried by a restraint belt to dispose the belt across the torso of the seated occupant;

pivot means mounting the lever on the seat cushion frame for movement between a first position establishing the buckle element in ready accessibility for latching engagement by the mating buckle element and a second position in which the buckle element is stored within the seat cushion;

an anchor coupling acting between the lever and the floor effective when the lever is established in the first position to provide a force transmitting connection between the seat cushion frame and the floor via the lever to transfer belt loads into the vehicle floor and prevent pivotal movement of the seat cushion, and said anchor coupling permitting pivotal movement of the seat cushion when the lever is established in the second position;

and means mounted within the seat cushion responsive to depression of the seat cushion by the presence of an occupant seated thereon to pivot the lever into the first position to automatically couple the buckle element and cushion frame with the floor whenever the seat cushion is occupied and uncouple the buckle and seat cushion from the floor whenever the seat is unoccupied to enable pivotal movement of the seat cushion.

* * * * *